July 4, 1967  K. E. MORAN  3,328,837

BLOW-MOLDING APPARATUS

Filed Sept. 28, 1962

INVENTOR.
KEVIN E. MORAN
BY Edward H. Lang
ATTORNEY

INVENTOR.
KEVIN E. MORAN
BY
ATTORNEY

INVENTOR.
KEVIN E. MORAN

INVENTOR.
KEVIN E. MORAN
BY Edward N. Lang
ATTORNEY 3,328,837
BLOW-MOLDING APPARATUS
Kevin E. Moran, Crystal Lake, Ill., assignor, by mesne assignments, to Union Oil Company of California, Los Angeles, Calif., a corporation of California
Filed Sept. 28, 1962, Ser. No. 226,922
2 Claims. (Cl. 18—5)

This invention relates to molding hollow articles from plastic materials and, more particularly, to a continuous operation in which a plastic container is blow molded, filled with a product, and sealed at high speeds.

One conventional method by which hollow plastic articles, such as bottles, are blow molded is by extruding a tube of heat-softened plastic material from an annular extrusion nozzle between two halves of a sectional mold cored to the shape and dimensions of the required bottle. After the tubular plastic material is extruded, the mold halves are closed around the tube to pinch the end of the tube, thereby closing and sealing it. The heat-softened tube, which is still connected to the plastic in the extrusion nozzle, is then expanded against the cored surface of the mold cavity by air introduced into the interior of the tube through a center opening in the extrusion orifice. The bottle thus formed is severed from the extrusion head and removed from the mold cavity after it has sufficiently cooled.

In a second conventional process, the tubular plastic material is extruded continuously from an extrusion nozzle and molds are positioned around the tubing and closed while moving continuously away from the nozzle. The closed molds are replaced by a following set of open molds. The tubing, which is pinched closed at both ends by the closing of the molds, is inflated through a "needle" that punctures the tube at a point that is later trimmed off.

Both of the above-described conventional methods of blow molding bottles suffer from various drawbacks. These conventional methods require the costly and wasteful secondary operations to remove trim from the bottle-neck and bottom portions of the tube. Still another separate operation is required for filling the containers. Since the filling operation quite frequently takes place at a plant location different from that where the bottles are made, it is often necessary to store and/or transport the empty containers. In addition, conventional plastic bottles require movably mounted closures, whereas the ultimate use of the containers may not require a separate closure. For example, a separate closure is not required when the entire contents of the container are to be dispensed at one time, as in the case of one-quart containers of lubricating oils sold by gasoline filling stations. In many instances, the need for separate closures for containers can be satisfactorily, if not advantageously, eliminated by forming the container with an integral, self-sealing pour spout.

Containers with integral, self-sealing pour spouts are especially well suited to the packaging of liquids, such as lubricating oils, but will also find use in the packaging of many other types of liquids, semi-solids, and solids, such as condiments, etc. Such containers are provided with a pre-marked area in a wall thereof which can be slit to open the container. The container is so shaped that the application of pressure to the container walls will spread the edges of the slit apart to form an opening through which the contents can be dispensed, while removal of the pressure permits the edges of the slit to come back together and seal the container.

My invention is based on a novel blow molding apparatus and method which overcomes the above-mentioned disadvantages inherent in conventional blow molding operations. In the blow molding of plastic containers in accordance with this invention, a tube of heat-softened plastic material is continuously extruded from an extruder nozzle while the extruder nozzle and a series of sectional molds, aligned in end-to-end relationship, are moved with respect to each other at a speed equal to the extrusion speed. Preferably, the extruder is stationary and it continuously extrudes the tubular plastic in a downward direction, while the sectional molds are circumferentially mounted on a circular mold carrier mounted for rotation on a horizontal axis in the same direction that the tubular plastic is extruded. The halves of each of the sectional molds are in succession opened and positioned around the tube to receive a length thereof and are then closed, while the next sectional mold is preparing to receive the next length of the tubular plastic. The sectional molds are so constructed that the closing thereof effects the closing and sealing of the lower end of the tube while the upper end of the tube is still connected to the extruder nozzle. The closing of the plastic tube also severs it from the formed article in the adjoining preceding sectional mold. Thereupon air is introduced into the interior of the tube through an opening in the extruder to blow the tube until it partially contacts the mold cavity. The complete expansion of the tube into molding contact with the mold cavity is caused by the application of a vacuum between the tube and the mold walls.

The application of the air pressure and vacuum is terminated and the open-ended container thus formed may be filled with its contents by a central fill pipe in the extruder while air is vented from the formed container at a rate sufficient to maintain pressure in the container. Finally the next sectional mold, having completely received the next length of the tubular plastic, closes to sever the formed and filled container from the tube being extruded, while concurrently sealing the open top of the filled container and lower end of the tubular plastic in the mold. The cycle is then repeated for forming the next container and the completed containers are ejected from the sectional molds at some later point in the revolution of the mold carrier. The sectional molds preferably travel at least 40° between the filling and ejecting steps in order to permit cooling and setting of the plastic before ejection. An especially convenient arrangement is realized when this travel is made to be about 90°.

As briefly mentioned above, the containers may be filled by the employment of an extrusion nozzle which includes a central conduit for filling the containers after they have been blown, but before the tops thereof are sealed. Should the characteristics of the liquid or particulate solid be such that it will not be adversely affected by the warm plastic, the introduction of the product, at a temperature lower than the setting temperature of the plastic, into the plastic envelope formed within the mold will serve to reduce the temperature of the plastic and hasten its solidification. Alternatively, the containers may be filled after they are completely formed with the tops thereof closed and sealed. An example of a suitable method of filling the formed container is by introducing the product through a hollow needle inserted through the wall of the container. Any opening left in the container after the needle is withdrawn is then sealed, as by the application of heat.

The apparatus may be designed such that the entire operation of forming, filling, and sealing is accomplished in as little as 0.6 second. Thus 100 units may be produced per minute, while providing at least 3 seconds for cooling after the package has been filled and sealed. Because the sectional molds are adjacent, 50 or more molds can be located on a mold carrier having a diameter of 10 ft., depending upon the desired dimensions of the containers.

It will be apparent that my invention overcomes many of the disadvantages inherent in conventional blow molding operations. The sectional molds, in adjacent, end-to-end relationship having means on corresponding ends thereof for sealing the tubular plastic and the open top of the containers while severing the container from the tubular plastic, eliminate the wasteful and costly secondary trimming operations which are necessary in conventional methods. In addition, the need for storing and/or transportation of empty containers, as well as a separate handling of the containers for filling purposes, are eliminated. Other advantages are that the operation is a continuous and high-speed operation, the need for separate closures is eliminated, and the containers are maintained in a sterilized condition.

Accordingly, a primary object of this invention is to provide a novel blow molding apparatus and method which eliminate the disadvantages inherent in conventional blow molding processes;

Another object of this invention is to provide a novel apparatus and method for producing hollow plastic articles;

Still another object of this invention is to provide a novel blow molding apparatus and method of forming hollow plastic articles which eliminates the need for trimming the formed articles; and A further object of this invention is to provide a novel blow molding apparatus and method in which the hollow container is filled with a product immediately after it is formed and while the container is heat-softened so that it may be sealed.

These and further objects of this invention will become apparent or be described as the description herein proceeds and reference is made to the accompanying drawings, in which.

Figure 2:
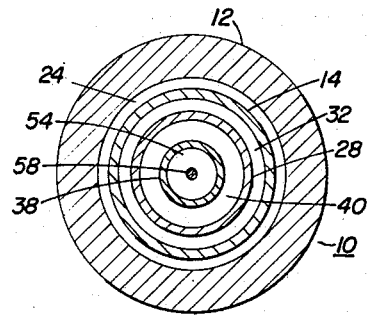
FIGURE 2 is a cross-sectional view of the extruding device shown in FIGURE 1 and taken along the line 2—2.
Figure 1:
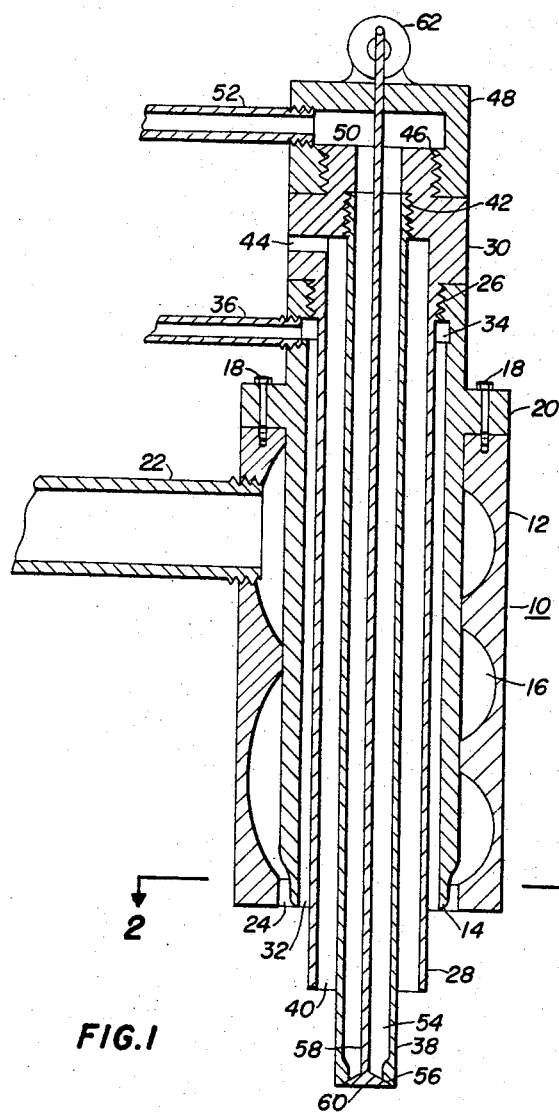
FIGURE 1 is a cross-sectional view showing a novel extruding device useful in this invention.

This invention is best described by reference to the accompanying drawings in which like numerals of reference represent corresponding components in each of the several drawings. Referring to FIGURES 1 and 2, the numeral 10 represents the extruding device comprising cylindrical casing 12 in which inner cylindrical tube 14 is mounted, defining therebetween plastic conduit 16. Inner cylindrical tube 14 is held in place by any suitable method, such as by bolts 18 extending through collar 20 of tube 14 to secure same to the upper surface of cylindrical casing 12. Although plastic conduit 16 is shown as being partly helical in shape, it may be any suitable shape, such as entirely annular. In order to simplify the illustration of extrusion device 10, means for keeping plastic material within conduit 16 in a heat-softened condition are omitted since such means may be readily provided by one skilled in the art. Examples of such means include heating chambers within the wall of cylindrical casing 12 and/or inner cylindrical tube 14 through which a heating medium is circulated, or an electric strip heater around the outer wall of casing 12. Heat-softened plastic is introduced into extruding device 10 through inlet pipe 22, from which it flows into plastic conduit 16 where it is kept in a heat-softened condition until it is extruded from annular orifice 24.

Held in place within cylindrical tube 14 by means of treads 26 is a second inner cylindrical tube 28 having collar 30 which abuts against the upper surface of cylindrical tube 14. The outer diameter of second inner cylindrical tube 28 is less than the inner diameter of first cylindrical tube 14 to form annular air pressure passageway 32. Adjacent to passageway 32 is annular conduit 34 leading to valve-controlled conduit 36, which in turn is connected to a source of pressurized air. Positioned within second inner cylindrical tube 28 is third inner cylindrical tube 38, defining therebetween annular air vent passageway 40. Third inner tube 38 is secured to second cylindrical tube 28 by means of threads 42. Collar 30 has outlet 44 leading from annular passageway 40 to vent air pressure from passageway 40.

Threadably secured to the upper portion of tube 28 by threads 46 is inverted cup-shaped member 48 forming space 50, which connects product conduit 52 to longitudinal passageway 54 in cylindrical tube 38. The flow of product from passageway 54 is controlled by any suitable method. The illustrated method is to form the lowermost edge of tube 38 with concave conical surface 56. Reciprocally mounted within longitudinal passageway 54 is rod 58 provided with convex closure 60 to engage concave surface 56 in fluid-tight relationship. The movement of rod 58 is controlled, for example, by a crank or eccentric cam mounted on wheel 62 which rotates in proper timed relation to the operating cycle yet to be described.

Various modifications of the extruding device 10 illustrated in FIGURES 1 and 2 will be apparent to one skilled in the art. For example, separate air vent and pressure conduits may be eliminated, and one passageway with the proper external valve-controlled means used to serve the dual purpose. The reciprocal movement of rod 58 in passageway 54 may be controlled by a solenoid, by biasing rod 58 in an upward position with a spring and moving it downward with a cam, and the like. Still further alternatives for controlling the flow of product in passageway 54 would include the provision of a valve in conduit 52, and closure means where passageway 54 intercepts passageway 50 to close passageway 50. Although the extruding device has been described as having cylindrical-shaped tubes, tubes of any shape may be used, and mounting means other than threads as described may be employed for assembling the various components of the extruding device.

Figure 3:
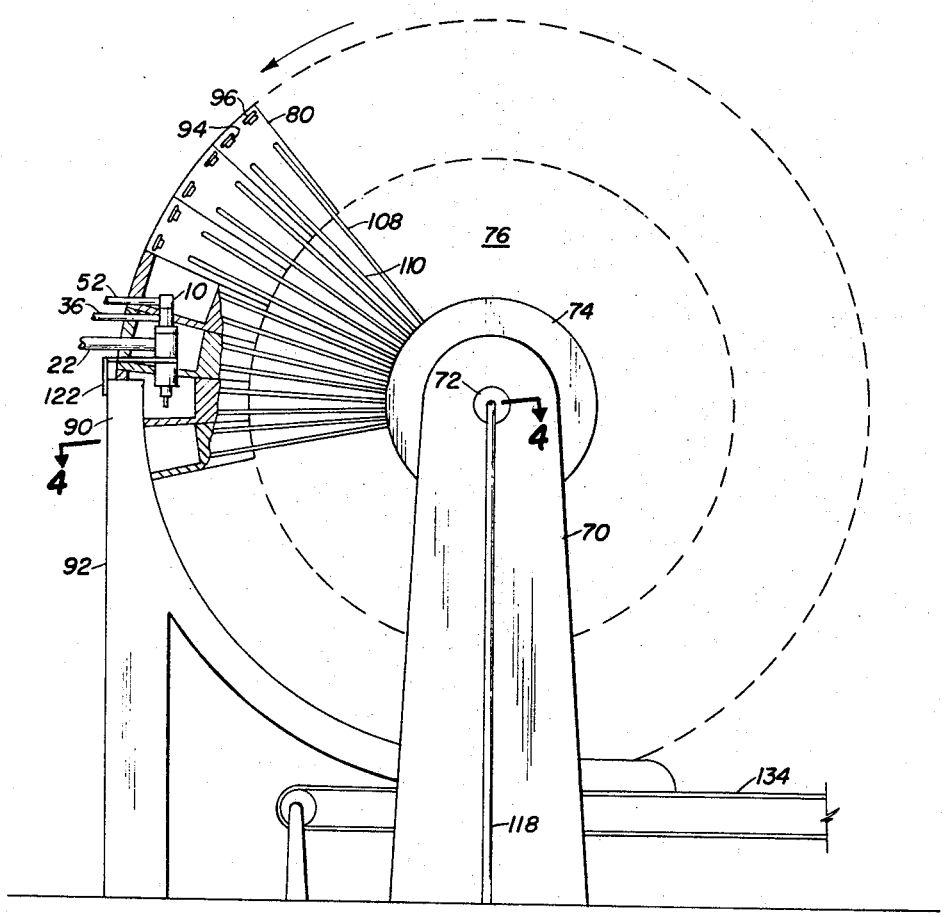
FIGURE 3 is an elevation of an apparatus suitable for carrying out this invention.
Figure 4:
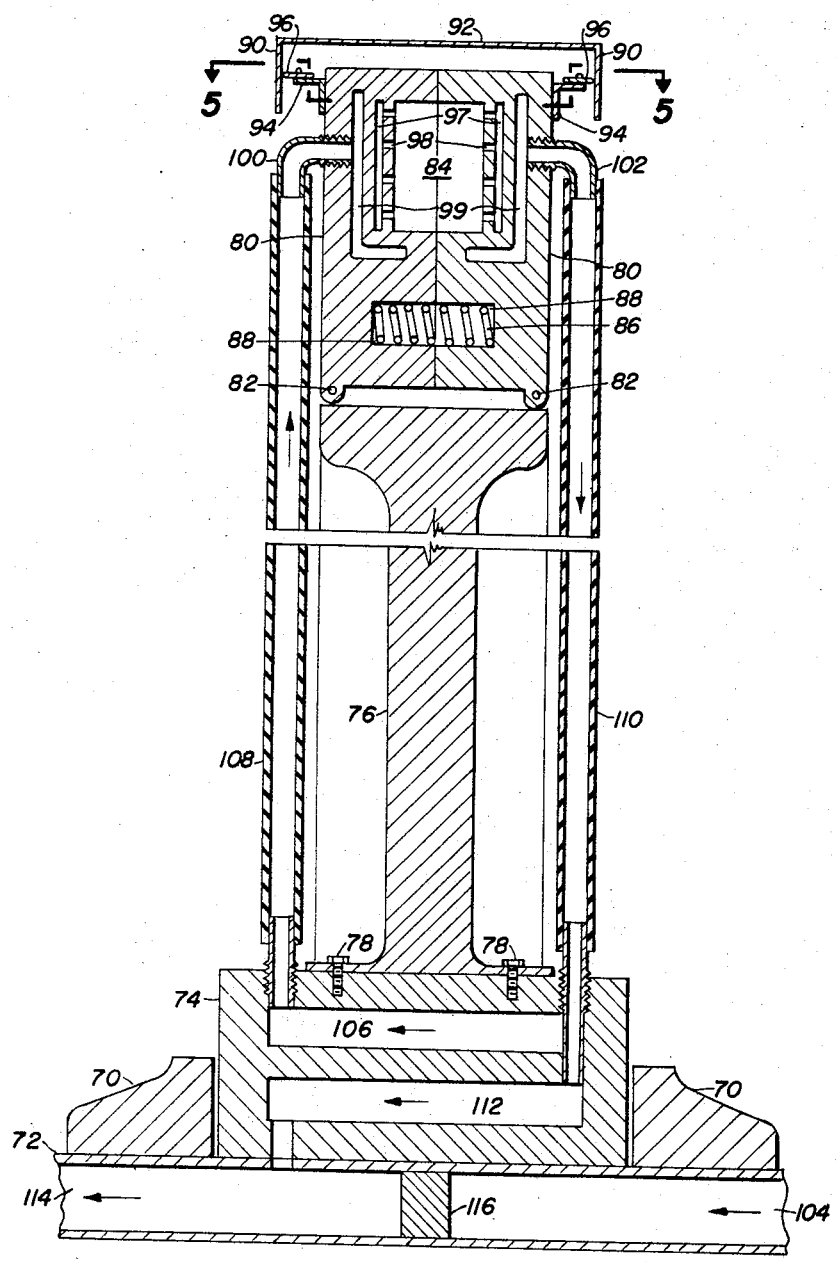
FIGURE 4 is a section on an enlarged scale on line 4—4 of FIGURE 3.

Referring to FIGURES 3 and 4, the numeral 70 represents the support member of the molding apparatus, in which hollow shaft 72 is rotatably mounted. Shaft 72 receives motion to rotate in the direction indicated by the arrow in FIGURE 3 by means not shown for the sake of simplicity. Shaft 72 has keyed thereon hub 74 to which annular mold carrier 76 is secured by bolts 78. Mounted around the periphery of annular mold carrier 76 in adjacent end-to-end relationship are a plurality of sectional molds, each of which includes a pair of mating mold halves 80. Mold halves 80 are pivotally attached to carrier 76 by pins 82 secured to carrier 76 to permit opening and closing the molds. When closed, mold halves 80 define mold cavity 84 which conforms to the shape of the article to be blow molded.

Suitable means are provided for opening and closing the pivoted mold halves 80 at predetermined intervals of time during the operation of the machine. In the embodiment of the invention herein illustrated, the actuating means for opening mold halves 80 comprises spring 86 disposed in adjoining cavities 88 of each pair of mold halves 80 to bias same in an open position. The biasing of mold halves 80 opened by spring 86 is counteracted and mold halves 80 are held in a closed position by passing the ends thereof between inwardly extending lips 90 of guide member 92. Secured to the ends of mold halves 80 are L-shaped brackets 94 on which are rotatably mounted rollers 96 to engage the inner surfaces of lips 90.

Mold halves 80 are preferably provided with vacuum chambers 97 which are connected to mold cavity 84 through apertures 98 to evacuate cavity 84. Vacuum chambers 97 are connected to a source of vacuum to evacuate cavity 84 of each sectional mold at the proper time in the operating cycle of the apparatus. The source of vacuum and the connection of same to chambers 98 are not shown for the sake of simplicity.

Mold halves 80 are cooled by circulating a cooling medium, such as water, through cooling chambers 99, each of which is provided with a cool water inlet 100 and a warm water outlet 102. Cool water is introduced into cooling chambers 99 through longitudinal opening 104 in hollow shaft 72, from where it flows through a conduit, not shown, into annular chamber 106, through flexible conduit 108, and into inlet 100. The cooling medium, which is warmed by plastic in cavity 84, leaves cooling chamber 99 through outlet 102, and flows through flexible conduit 110. The fluid in conduit 110 enters annular chamber 112 in hub 74, from where it flows through longitudinal opening 114 in hollow shaft 72. Longitudinal openings 104 and 114 are separated by plug 116. The warmed cooling fluid in longitudinal opening 114 is withdrawn through conduit 118 and is cooled by a suitable means, such as passing it through a cooling tower, before it is recirculated through opening 104. The means for withdrawing the warmed fluid from opening 114 and introducing a cool liquid into opening 104 while hollow shaft 72 is rotating are not shown for the sake of simplicity.

Referring now to FIGURES 3 and 5 to 8, inclusive, the steps in forming and filling a plastic container will be described. In order to simplify the illustration of the steps, certain details such as the apparatus and means for supplying heated plastic material, the product, and air to the extruding device are omitted since such apparatus and means may readily be provided by one skilled in the art. Assuming machine shaft 72 to rotate in the direction of the arrow shown in FIGURE 3, the sectional molds are moving in the same direction as the parison 120 (FIGURES 5–8) which is being extruded from extruding device 10 at substantially the same speed, while extruding device 10 is held stationary, as by bracket 122 secured to guide 92. Mold halves 80 are held in an open position by spring 86 (FIGURE 4) so that lateral edges 124 adjacent the base of container cavity 84 pass around extruding device 10. Lateral edges 124 are beveled to define a pair of pinching jaws or edges for severing plastic tubing 120 therebetween and concomitantly sealing the severed ends as hereinafter described.

Figure 5:
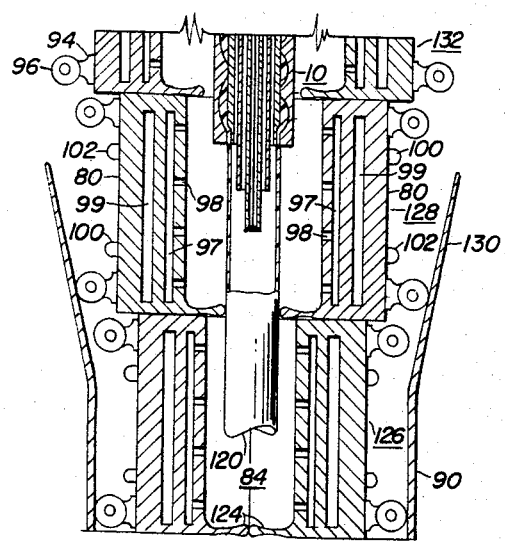

Referring to FIGURE 5 which shows the apparatus in a start-up position, sectional mold 126 is illustrated as having received the initial length of parison 120 extruded from device 10 while sectional mold 128 is receiving the next length of parison 120. Sectional mold 128 is being gradually closed after lateral edges 124 thereof pass extruding device 10 by lowermost rollers 96 thereof engaging flared ends 130 of mold ramp 90. Flared ends 130 are so shaped and located in a position relative to extruding device 10 that the downward movement of each of the sectional molds will cause halves 80 thereof to completely close after they have passed extruding device 10 to permit the tops of halves 80 to pass under extruding device 10. The gradual closing of halves 80 moves lateral edges 124 thereof toward each other until they close to sever parison 120 therebetween. Lateral edges 124 are shaped such that the severing of parison 120 therebetween also effects the sealing of the severed ends in the adjacent mold cavities 84.

Figure 6:
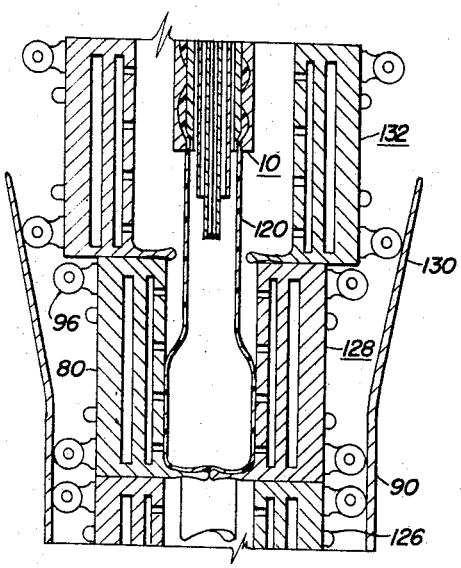
FIGURES 5 to 8 are cross-sectional views through line 5—5 of FIGURE 4 depicting the steps in the performance of the novel method.

After a length of parison 120 is completely received in cavity 84 of sectional mold 128 and sectional mold 128 is closed to effect the severing and sealing of the lower end of the received length of plastic tube 120, air is introduced through conduit 32 to expand the received length of plastic tube 120 to conform approximately to the shape of cavity 84. The blowing of plastic tube 120 received in cavity 84 of mold 128 is illustrated in FIGURE 6. It will be evident that the air blowing must be so regulated that only the length of parison 120 in cavity 84 of mold 128 is expanded. Preferably, the air blowing is terminated when the expanded portion of tube 120 in cavity 84 of mold 128 is a short distance from the top of section mold 128. A vacuum is preferably applied to cavity of mold 128 to cause parison 120 to be pressed tightly against the sides of cavity 84. The next sectional mold 132 is beginning to pass extruding device 10 to receive a segment of tube 120 while the blowing operation is taking place in mold 128.

Figure 7:
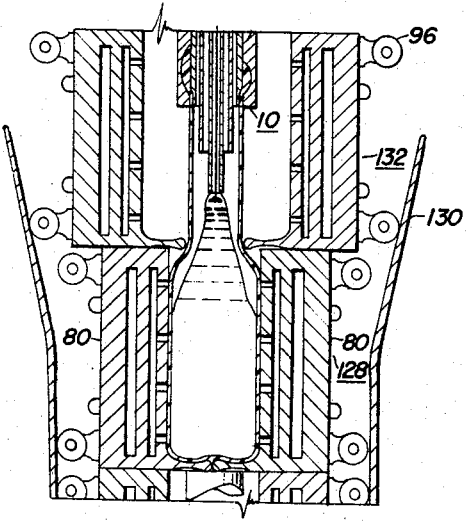
Figure 8:
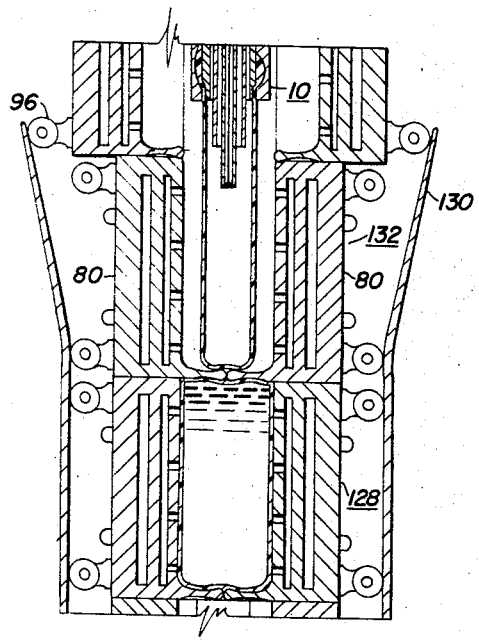

After the container is thus formed, closure 60 is moved downward to introduce the product in conduit 54 into the formed container, as illustrated in FIGURE 7. After a predetermined quantity of the product has been introduced into the formed container, rod 58 is raised to cause closure 60 to engage concave surface 56 in sealing relationship. While the formed container is being filled in such a manner, the air displaced from the formed container is vented through annular conduit 40. This filling operation must be completed before the next length of parison 120 is completely received in cavity 84 of sectional mold 132. After the next length of parison 120 has been received in cavity 84 of sectional mold 132, the downward movement of rollers 96 of mold 132 between lips 90 causes lateral edges 124 of sectional mold 132 to close, thereby severing the container in sectional mold 128 and tube 120 in mold 132, while sealing the top of the container and bottom of the tube, as shown in FIGURE 8.

As sectional mold 128, containing the sealed filled container, moves between lips 90 of guide 92, the cooling and setting of the container is hastened by cooling medium circulating through cooling chambers 99. Consequently, when sectional mold 128 reaches the bottom of its circular path, the container has been cooled sufficiently to have enough rigidity to support itself and maintain its shape. At this point, guide 92 is terminated to cause sectional mold 128 to open and eject the filled container, as onto conveyor belt 134, and carried on to the requisite printing and boxing operations.

Although this invention has been described in relation to specific embodiments, it is contemplated that various modifications may be made without departing from the intended scope of this invention. For example, various modifications may be made in the extruding device. Although the extruding device has been described as having cylindrical-shaped tubes, tubes of any shape may be used. One of the inner conduits may be eliminated and the same conduit used for introducing the blow air and venting the displaced air in combination with suitable valve means. The closure for the product conduit may be eliminated from the extruding device and be replaced with other means for controlling the supply of the product to the extruding device. The extruding device in my co-pending U.S. patent application, Ser. No. 155,918, filed Nov. 30, 1961, may be used. Other means for opening and closing the sectional molds may be used. For example, the mold halves may be biased in a closed position with the guide including means to open the sectional molds. If desired, this invention may be used for merely forming unfilled hollow articles.

While this invention has been described for use with thermoplastic material, it is understood that it may be used for making hollow articles from thermosetting materials, but it will be necessary to provide heating instead of cooling to set the material and cooling instead of heating to prevent hardening. Thus, materials with which this invention may be used include thermoplastic materials, which are moldable at moderate temperatures, such as polyethylene, polypropylene, styrene polymers, and vinyl polymers; thermoplastic materials, which are moldable only at relatively high temperatures, such as glass; and thermosetting materials, such as urea-formaldehyde resins, diallyl phthalate, and polyester resins. The temperature controls will be modified in accordance with the characteristics of the particular material being used.

The embodiments of this invention in which an exclusive property or privilege is claimed are defined as follows:

1. An apparatus for continuously forming hollow plastic articles comprising, in combination, an extruder nozzle adapted to form a continuously extending moldable tube of plastic, a plurality of axially aligned pairs of mold halves mounted on a circular rotatable mold carrier, said mold halves each being pivotally mounted on said mold carrier and biased in open position, stationary mold guide members comprising a pair of spaced circular lips spaced from and in sliding contact with the sides of said mold halves, said mold guide members adapted to move said mold halves from open to closed position as said mold carrier rotates, said extruder nozzle being mounted in the path of rotation of said mold halves and adapted to place a moldable plastic tube between open pairs of mold halves, said tube extending in the same direction and at substantially the same speed as said mold carrier rotates, the mold cavity formed by said mold halves in closed position having an open end and a closed end transverse to said sides, the open ends of one pair of mold halves abutting against the closed end of the adjacent pair of mold halves whereby the closing of one pair of mold halves severs said tube of plastic and seals same into a transverse wall within its mold cavity and simultaneously forms the closed top in the open end of the preceding pair of mold halves.

2. An apparatus in accordance with claim 1 in which said extruder nozzle comprises a plurality of concentric, spaced tubular members forming therebetween a plurality of annular conduits and means to inject said moldable plastic through the outermost of said annular conduits, means to inject a fluid under pressure through an inner annular conduit and one of said inner annular conduits serving to vent fluid from said plastic tube so formed and so molded.

References Cited

UNITED STATES PATENTS

| | | | |
|---|---|---|---|
| 2,515,093 | 7/1950 | Mills | 18—56 X |
| 2,632,202 | 3/1953 | Haines | 53—29 X |
| 2,750,625 | 6/1956 | Colombo | 18—5 |
| 2,790,994 | 5/1957 | Cardot et al. | 18—55 X |
| 2,801,444 | 8/1957 | Lorenian | 53—29 X |
| 2,954,581 | 10/1960 | Colombo | 18—5 |
| 2,975,472 | 3/1961 | Colombo | 18—5 |
| 3,020,689 | 2/1962 | Luther | 53—140 |
| 3,025,561 | 3/1962 | Ruekberg et al. | 18—58 |
| 3,035,302 | 5/1962 | Lysobey | 18—5 |
| 3,089,185 | 5/1963 | Settembrini | 18—55 X |
| 3,162,706 | 12/1964 | Cheney | 53—140 X |
| 3,200,179 | 8/1965 | Moran | 53—140 X |

TRAVIS S. McGEHEE, *Primary Examiner.*

BROMLEY SEELEY, *Examiner.*

N. ABRAMS, W. M. COHEN, *Assistant Examiners.*